(12) United States Patent
Kozan et al.

(10) Patent No.: US 10,274,109 B2
(45) Date of Patent: Apr. 30, 2019

(54) ENGINE BLOCK CLAMP ASSEMBLY

(71) Applicant: United Technologies Corporation, Hartford, CT (US)

(72) Inventors: Stuart C. Kozan, Bethany, CT (US); Conrad W. Cote, Norwich, CT (US)

(73) Assignee: United Technologies Corporation, Farmington, CT (US)

( * ) Notice: Subject to any disclaimer, the term of this patent is extended or adjusted under 35 U.S.C. 154(b) by 69 days.

(21) Appl. No.: 15/064,749

(22) Filed: Mar. 9, 2016

(65) Prior Publication Data
US 2017/0261153 A1    Sep. 14, 2017

(51) Int. Cl.
| F16L 3/10 | (2006.01) |
| F16L 3/223 | (2006.01) |
| B60R 16/02 | (2006.01) |
| F16L 55/035 | (2006.01) |

(52) U.S. Cl.
CPC ........ F16L 3/1083 (2013.01); B60R 16/0215 (2013.01); F16L 3/1025 (2013.01); F16L 3/223 (2013.01); F16L 3/2235 (2013.01); F16L 55/035 (2013.01)

(58) Field of Classification Search
CPC ....... F16L 3/223; F16L 3/2235; F16L 3/1008; F16L 3/1025; F16L 3/1058; F16L 3/1083; F16L 3/227; Y10T 24/1441; Y10T 24/1427; Y10T 24/1443; Y10T 24/1412; Y10T 24/1451; Y10T 24/1433; Y10T 24/1435; F16B 33/02; F16B 33/04; F16B 33/08

USPC ......... 248/62, 65, 68.1, 73, 74.1, 74.2, 905, 248/316.1, 316.7, 74.4, 316.4
See application file for complete search history.

(56) References Cited

U.S. PATENT DOCUMENTS

| 2,396,925 | A | * | 3/1946 | Morehouse | F16L 3/223 |
| | | | | | 174/40 CC |
| 2,683,578 | A | * | 7/1954 | Rainey | H01B 17/306 |
| | | | | | 174/146 |
| 3,592,427 | A | * | 7/1971 | Misuraca | F16L 3/227 |
| | | | | | 248/68.1 |
| 3,964,773 | A | * | 6/1976 | Stade | F01N 13/1805 |
| | | | | | 285/367 |
| 5,110,074 | A | * | 5/1992 | Deguchi | F16B 2/06 |
| | | | | | 248/340 |
| 5,499,430 | A | * | 3/1996 | Strazar | F16L 33/08 |
| | | | | | 24/19 |
| 6,572,057 | B1 | * | 6/2003 | Roth | F16L 3/24 |
| | | | | | 248/217.2 |

(Continued)

Primary Examiner — Jonathan Liu
Assistant Examiner — Guang H Guan
(74) Attorney, Agent, or Firm — Snell & Wilmer, L.L.P.

(57) ABSTRACT

An engine block clamp assembly is provided. The engine block clamp assembly may comprise an engine block clamp frame configured to clamp around the axially outward edge of a silicone insert. The silicone insert may comprise a series of apertures configured to removably receive external engine tubes and electrical harnesses. The engine block clamp frame may comprise a tabbed clamp half and a slot clamp half. The tabbed clamp half may have a tabbed end and a mounting end. The tabbed end may comprise a tabbed hinge. The slot clamp half may comprise a slot end and a mounting end. The slot end may comprise a slot. The tabbed hinge may be configured to operatively fit within the slot to couple the tabbed clamp half to the slot clamp half.

18 Claims, 6 Drawing Sheets

(56) References Cited

U.S. PATENT DOCUMENTS

| | | | | |
|---|---|---|---|---|
| 7,540,071 B2* | 6/2009 | Sampson | ............... | F16L 3/1025 |
| | | | | 24/279 |
| 7,546,986 B2* | 6/2009 | Kim | ............... | F16L 3/1008 |
| | | | | 248/62 |
| 8,074,945 B2* | 12/2011 | Schoenau | ............... | F16L 5/14 |
| | | | | 248/316.6 |
| 8,267,357 B2* | 9/2012 | Kataoka | ............... | B61D 49/00 |
| | | | | 174/135 |
| 8,541,682 B2* | 9/2013 | Mazelle | ............... | H02G 3/32 |
| | | | | 174/68.1 |
| 8,662,457 B2* | 3/2014 | Sampson | ............... | F16L 3/1083 |
| | | | | 248/62 |
| 8,870,132 B2* | 10/2014 | Sampson | ............... | F16L 3/123 |
| | | | | 248/62 |
| 9,033,290 B2* | 5/2015 | Shepard | ............... | F16L 3/1025 |
| | | | | 248/62 |
| 9,142,946 B2* | 9/2015 | Krager | ............... | H02G 3/32 |
| 2017/0030486 A1* | 2/2017 | Sampson | ............... | F16L 3/1083 |
| 2017/0261153 A1* | 9/2017 | Kozan | ............... | F16M 13/02 |

* cited by examiner

ENGINE BLOCK CLAMP ASSEMBLY

FIELD

The present disclosure relates to external engine components, and more specifically, to an engine block clamp assembly for external engine components.

BACKGROUND

Engine external components may comprise a variety of electrical harnesses to supply electricity to the engine and tubes to carry fluid to the engine. Engine block clamps may be used to hold the various electrical harnesses and tubes into position, and to add stiffness and dampening for resonant frequency. Typically, engine block clamps may comprise a silicone insert configured with voids to hold the various engine tubes and electrical harnesses in place, with a metal outer band clamped around the circumferential edge of the silicone insert to hold the engine block clamp into a desired position. Typically, the outer band may comprise two metal pieces configured to clamp around the silicone insert through the use of a welded piano hinge. The silicone block is typically formed through a complex molding and cutting process. Because of the cost and complex tooling required in typical engine block clamps, modifications and changes to configurations may be costly and time intensive.

SUMMARY

In various embodiments, an engine block clamp assembly is disclosed. The engine block clamp assembly may comprise a silicone insert having an at least one aperture. An engine block clamp frame may be configured to clamp around a circumferential edge of the silicone insert The engine block clamp frame may comprise a tabbed clamp half and a slot clamp half coupled to the tabbed clamp half.

In various embodiments, the tabbed clamp half may comprise a tabbed end opposite of a mounting end. The tabbed end may comprise a tabbed hinge. The slot clamp half may comprise a slot end opposite of a mounting end. The slot end may comprise a slot. The slot clamp half may couple to the tabbed clamp half by inserting the tabbed hinge into the slot. The engine block clamp assembly may also comprise a first retaining clip coupled to an axially outward surface of the tabbed clamp half. The engine block clamp assembly may also comprise a second retaining clip coupled to an axially outward surface of the slot clamp half. The silicone insert may be formed using a waterjet cutting process. The waterjet cutting process may use a pure water to cut the silicone insert, without the use of any abrasive media in the water.

In various embodiments, an engine block clamp frame is disclosed. The engine block clamp frame may comprise a tabbed clamp half and a slot clamp half. The tabbed clamp half may have a tabbed end opposite of a mounting end. The tabbed end may comprise a tabbed hinge and the mounting end may comprise a mounting hole. The slot clamp half may have a slot end opposite of a mounting end. The slot end may comprise a slot and the mounting end may comprise a mounting hole. The slot clamp half may be configured to couple to the tabbed clamp half by inserting the tabbed hinge into the slot.

In various embodiments, the engine block clamp frame may further comprise a first retaining clip coupled to an axially outward surface of the tabbed clamp half. The engine block clamp frame may further comprise a second retaining clip coupled to an axially outward surface of the slot clamp half. The engine block clamp frame may further comprise a silicone insert. The tabbed clamp half and the slot clamp half may be configured to clamp around the circumferential edge of the silicone insert. The silicone insert may be formed using a waterjet cutting process. The waterjet cutting process may use a pure water to cut the silicone insert, without the use of any abrasive media in the water. The silicone insert may comprise a width of 0.75 inch.

In various embodiments, an engine block clamp assembly is disclosed. The engine block clamp assembly may comprise a silicone insert having an at least one aperture. The engine block clamp assembly may also comprise an engine block clamp frame configured to clamp around the circumferential edge of the silicone insert. The engine block clamp frame may comprise a tabbed clamp half and a slot clamp half. The tabbed clamp half may have a tabbed end opposite of a mounting end. The tabbed end may comprise a tabbed hinge. The slot clamp half may have a slot end opposite of a mounting end. The slot end may comprise a slot. The slot clamp half may be configured to couple to the tabbed clamp half by inserting the tabbed hinge into the slot.

In various embodiments, the engine block clamp assembly may further comprise a first retaining clip coupled to an axially outward surface of the tabbed clamp half. The engine block clamp assembly may also comprise a second retaining clip coupled to an axially outward surface of the slot clamp half. The silicone insert may be formed using a waterjet cutting process. The waterjet cutting process may use a pure water to cut the silicone insert, without the use of any abrasive media. The silicone insert may comprise a width of 0.75 inch.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1A:
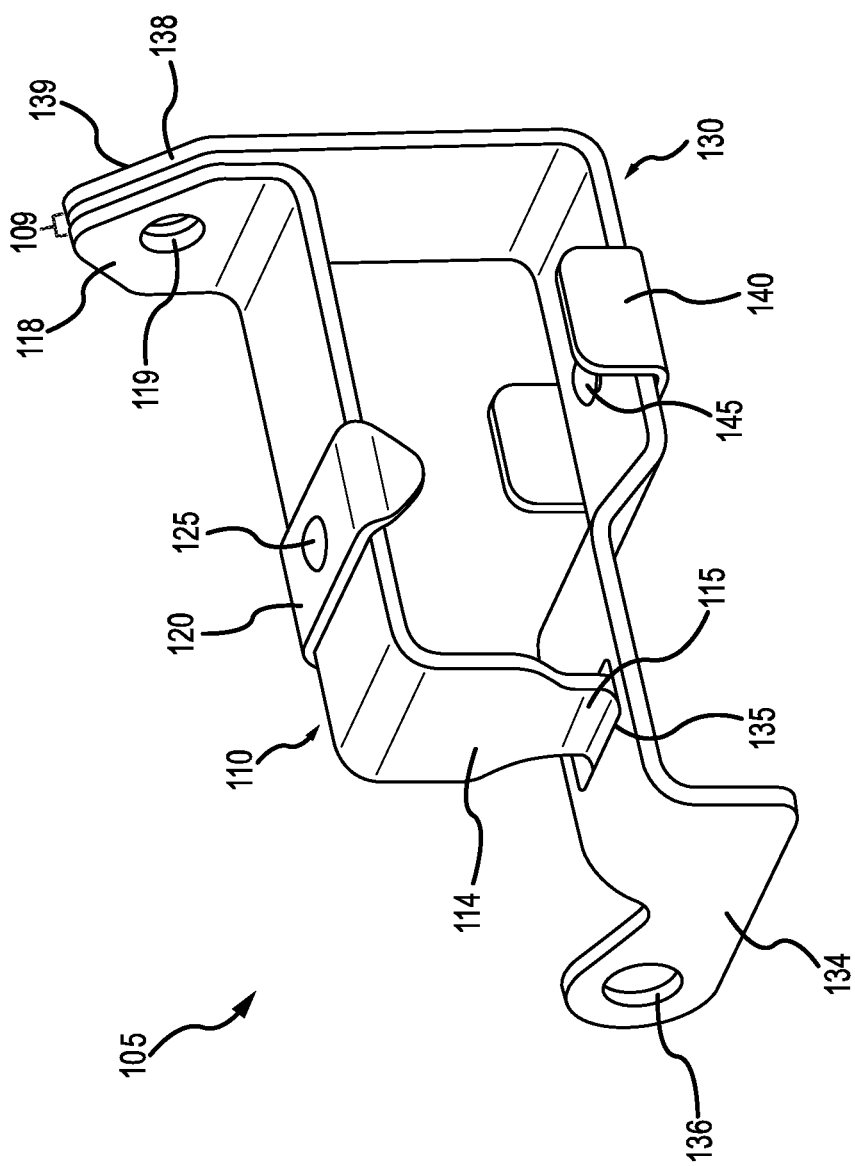
FIG. 1A illustrates a perspective view of an engine block clamp frame, in accordance with various embodiments.
Figure 1B:
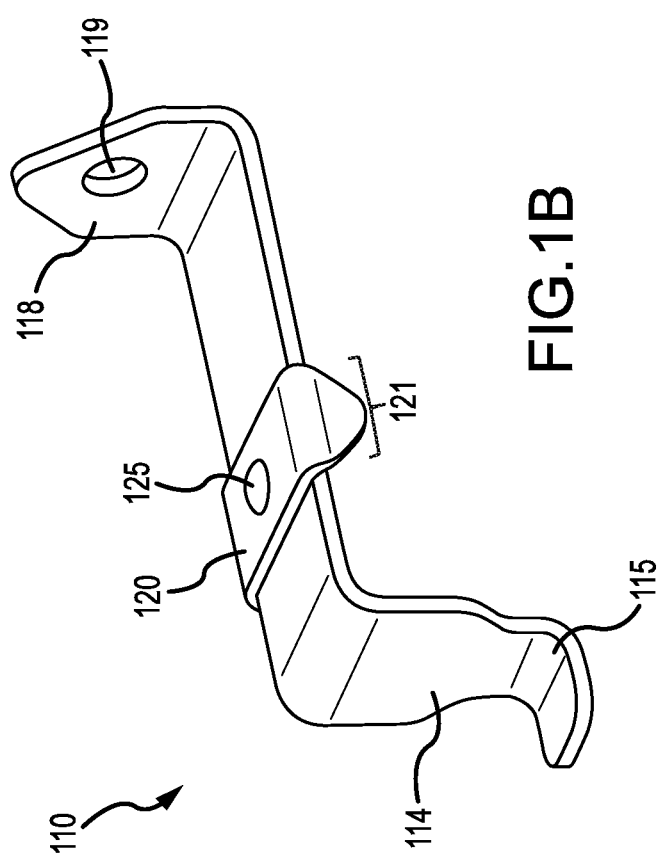
FIG. 1B illustrates a perspective view of a tabbed clamp half, in accordance with various embodiments.
Figure 1C:
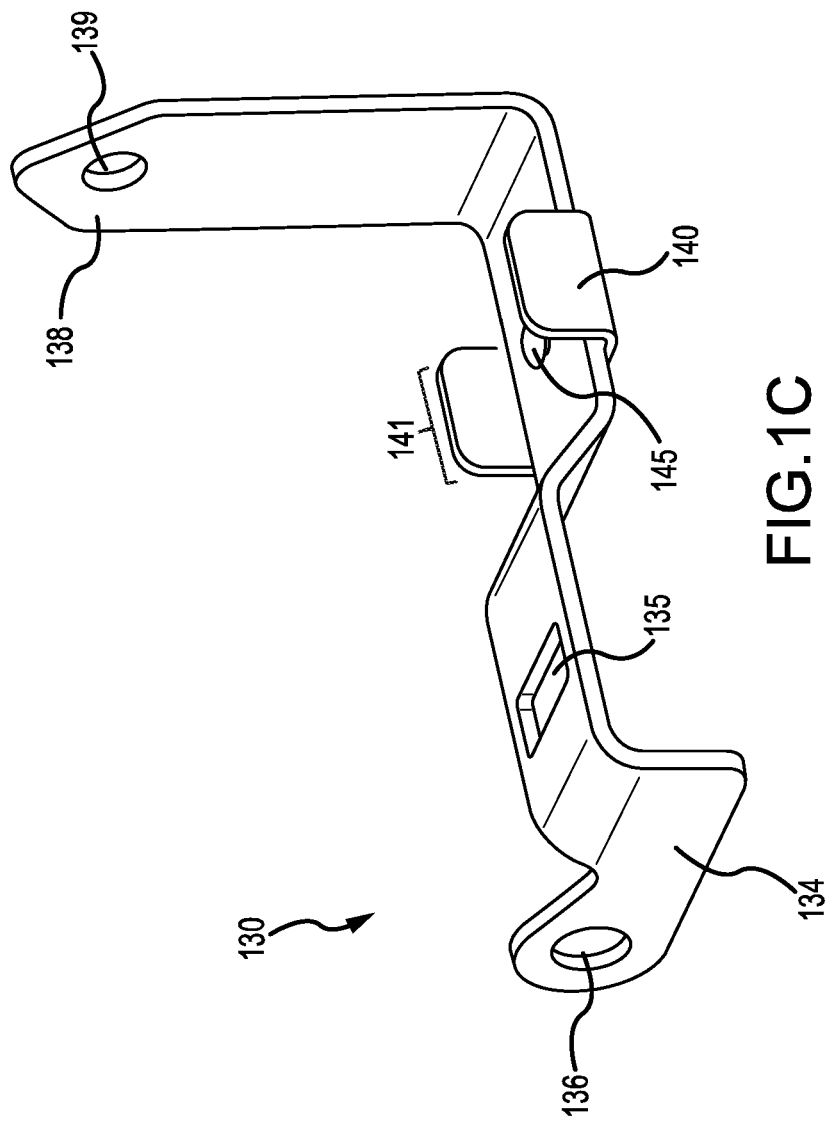
FIG. 1C illustrates a perspective view of a slot clamp half, in accordance with various embodiments.

In various embodiments, and with reference to FIGS. 1A, 1B, and 1C, an engine block clamp frame 105 is disclosed. Engine block clamp frame 105 may be configured to operatively retain a silicone insert 250 (FIG. 2) into a fixed position. In this regard, engine block clamp frame 105 may clamp around the outer circumferential surface of the silicone insert 250 (FIG. 2), to retain the silicone insert 250 (FIG. 2) into position. Engine block clamp frame 105 may also provide a mounting point to mount the engine block clamp frame 105 into an engine, and/or other suitable mounting location. Engine block clamp frame 105 may comprise mounting holes, or other suitable connecting mechanisms, allowing engine block clamp frame 105 to be bolted and/or fastened onto a suitable surface. Engine block clamp frame 105 may comprise any suitable and/or desired material. For example, engine block clamp frame 105 may comprise a nickel-chromium alloy such as that sold under the mark INCONEL (e.g., INCONEL 600, 617, 625, 718, X-750 and others). Engine block clamp frame 105 may also comprise any suitable material having properties resistant to oxidation and corrosion in a variety of environments and temperature ranges.

In various embodiments, engine block clamp frame 105 may comprise a tabbed clamp half 110 and a slot clamp half 130. Tabbed clamp half 110 may comprise a tabbed end 114 opposite of a mounting end 118. Mounting end 118 may be configured as a mounting point to mount tabbed clamp half 110 to a surface. For example, mounting end 118 may comprise a mounting hole 119. Mounting hole 119 may be configured to accept a bolt, screw, fastener, and/or other such mechanism, allowing tabbed clamp half 110 to couple to the surface. Tabbed end 114 may be configured to couple to slot clamp half 130. In this regard, tabbed end 114 may comprise a tabbed hinge 115. Tabbed hinge 115 may be configured to couple to slot clamp half 130 to form a tab and slot joint. A tab and slot joint may comprise a coupling connection wherein a tabbed hinge is inserted into a slot to form a coupling between two objects. In this regard, tabbed hinge 115 may be configured to insert within slot 135 to couple tabbed clamp half 110 to slot clamp half 130. Tabbed hinge 115 may comprise a slight curvature, enabling tabbed clamp half 110 to retain within slot 135 in response to tabbed clamp half 110 coupling to slot clamp half 130.

Figure 2:
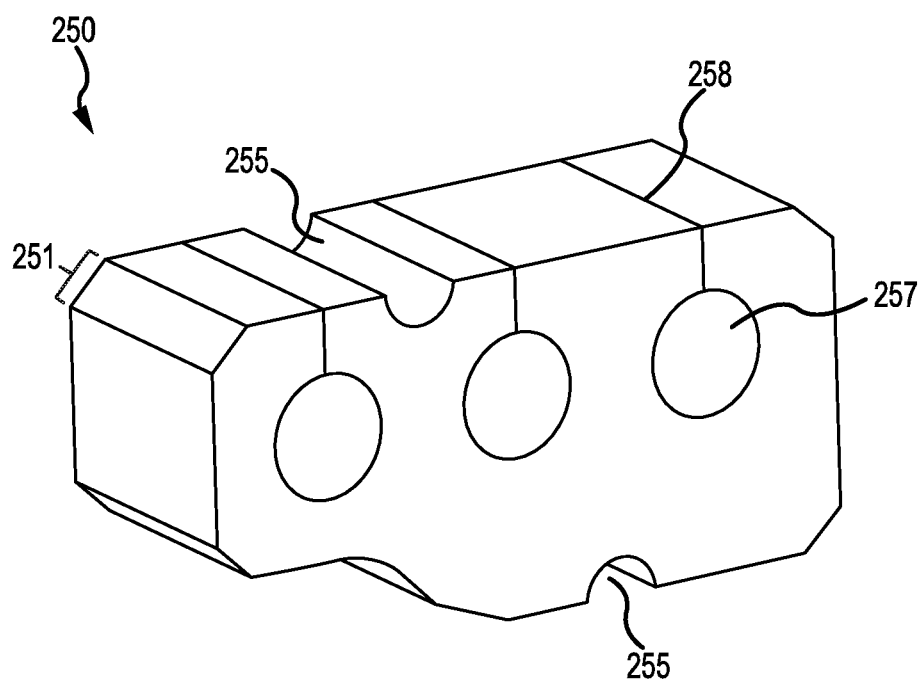
FIG. 2 illustrates a perspective view of a silicone insert, in accordance with various embodiments.

In various embodiments, tabbed clamp half 110 may also comprise a first retaining clip 120 located on an axially outer surface of tabbed clamp half 110, between tabbed end 114 and mounting end 118. First retaining clip 120 may be perpendicularly coupled to the axially outer surface of tabbed clamp half 110. First retaining clip 120 may be configured to further retain the silicone insert 250 (FIG. 2) within engine block clamp frame 105. In this regard, tabbed clamp half 110 may comprise any suitable and/or desired number of first retaining clips 120. To further retain the silicone insert 250 (FIG. 2), the ends of first retaining clip 120 may be formed, and/or bent, in a direction axially inwards of engine block clamp frame 105. The ends of first retaining clip 120 may be formed into a shape 121 capable of retaining the silicone insert 250 (FIG. 2). For example, shape 121 may comprise a triangle, a square, and/or a rounded edge. Shape 121 may comprise any suitable shape, dependent on the amount of clearance needed for engine block clamp frame 105.

In various embodiments, first retaining clip 120 may be coupled to tabbed clamp half 110 using any suitable method. For example, first retaining clip 120 may be coupled using a mechanical fastener, such as via a first rivet 125. First rivet 125 may comprise a short metal pin. First rivet 125 may be inserted through a punched or drilled hole in first retaining clip 120 and tabbed clamp half 110. Once into a desired position, first rivet 125 may be bucked (i.e., deformed) on one end to hold first retaining clip 120 into place. First retaining clip 120 may also be coupled using an adhesive, welding, and/or through any other suitable technique. In various embodiments, first retaining clip 120 may be any size suitable to hold the silicone insert 250 (FIG. 2) into position. First retaining clip 120 may also comprise any suitable material. First retaining clip 120 may comprise any material having a low bend radius (i.e., low bend radius may refer to the minimum radius a material can be bent without damaging the structural integrity of the material), such as, for example, austenitic stainless steel.

In various embodiments, slot clamp half 130 may comprise a slot end 134 located opposite of a mounting end 138. Mounting end 138 may comprise a mounting point to mount slot clamp half 130 to a surface. For example, mounting end 138 may have a mounting hole 139. Mounting hole 139 may be configured to accept a bolt, screw, and/or the like, allowing slot clamp half 130 to couple to a surface. In various embodiments, mounting hole 139 may substantially align with mounting hole 119 such that a bolt, and/or other similar type of coupling mechanism, may be passed through both mounting hole 139 and mounting hole 119, to couple engine block clamp frame 105 to a desired surface. In this regard, the coupling between mounting end 118 of tabbed clamp half 110 and mounting end 138 of slot clamp half 130 may comprise a compression gap 109. Compression gap 109 may be configured as a gap between mounting end 118 and mounting end 138, such that when engine block clamp frame 105 is mounted to the desired surface, compression gap 109 may decrease in size to impart compression into engine block clamp frame 105. Compression gap 109 may comprise any suitable gap allowing for a compression of engine block clamp frame 105 when mounted to a surface. For example, compression gap 109 may comprise a gap of 0.0156 inches (0.3969 mm) to 0.2500 inches (6.350 mm), 0.2500 inches (6.350 mm) to 0.500 inches (12.70 mm), or 0.500 inches (12.70 mm) to 1.0 inch (25.40 mm). In various embodiments, compression gap 109 may comprise a gap of 0.125 inches (3.175 mm).

In various embodiments, slot end 134 may be configured to couple to tabbed clamp half 110. In this regard, slot end 134 may comprise a slot 135. Slot 135 may be configured to operatively receive tabbed hinge 115 of tabbed clamp half 110. Slot 135 may therefore comprise any suitable size and shape capable of receiving tabbed hinge 115. In this regard, slot 135 may comprise a slightly larger width than tabbed hinge 115, such that tabbed hinge 115 may fit within slot 135. Slot end 134 may also comprise a second mounting hole 136. Second mounting hole 136 may comprise a mounting point to mount engine block clamp frame 105 to a second surface. To enable second mounting hole 136 to couple to different angled surfaces, the portion of slot end 134 comprising second mounting hole 136 may be bent to align with the second surface. Second mounting hole 136 may be configured to accept a bolt, screw, and/or the like, allowing slot clamp half 130 to couple to the second surface.

In various embodiments, slot clamp half 130 may also comprise a second retaining clip 140 located on the axially outer surface of slot clamp half 130 between slot end 134 and mounting end 138. Second retaining clip 140 may be perpendicularly coupled to the axially outer surface of slot clamp half 130. Second retaining clip 140 may be configured to further retain the silicone insert 250 (FIG. 2) within engine block clamp frame 105. In this regard, slot clamp half 130 may comprise any suitable and/or desired number of second retaining clips 140. To further retain the silicone insert 250, the ends of second retaining clip 140 may be formed, and/or bent, in a direction axially inwards of engine block clamp frame 105. The ends of second retaining clip 140 may be formed into a shape 141 capable of retaining the silicone insert 250 (FIG. 2). For example, shape 141 may comprise a triangle, a square, and/or a rounded edge. Shape 141 may comprise any suitable shape, dependent on the amount of clearance room needed for engine block clamp frame 105.

In various embodiments, second retaining clip 140 may be coupled to slot clamp half 120 using any suitable method. For example, second retaining clip 140 may be coupled using a mechanical fastener, such as via a second rivet 145. Second rivet 145 may comprise a short metal pin. Second rivet 145 may be inserted through a punched or drilled hole in second retaining clip 140 and slot clamp half 130. Once into a desired position, second rivet 145 may be bucked (i.e., deformed) on one end to hold second retaining clip 140 into place. Second retaining clip 140 may also be coupled using an adhesive, welding, and/or through any other suitable technique. In various embodiments, second retaining clip 140 may be any size suitable to hold the silicone insert 250 (FIG. 2) into position. Second retaining clip 140 may also comprise any suitable material. Second retaining clip 140 may comprise any material having a low bend radius (i.e., low bend radius may refer to the minimum radius a material can be bent without damaging the structural integrity of the material), such as, for example, an austenitic stainless steel.

In various embodiments, and with reference to FIG. 2, a silicone insert 250 for an engine block clamp assembly is disclosed. Silicone insert 250 may be configured to retain the various engine external harnesses and tubes into a fixed position. In that regard, engine external harnesses and tubes may be operatively passed through silicone insert 250, such that silicone insert 250 securely restricts the harnesses and tubes from movement. Silicone insert 250 may comprise any suitable shape and/or size. Silicone insert 250 may comprise any size and/or shape capable of fitting within the engine block clamp frame. For example, silicone insert 250 may comprise a width of 0.125 inches (3.175 mm) to 0.500 inches (12.70 mm), 0.500 inches (12.70 mm) to 1.0 inch (25.40 mm), 1.0 inch (25.40 mm) to 2.0 inches (50.80 mm), and/or any other suitable width. In various embodiments, silicone insert 250 may comprise a width of 0.750 inches (19.05 mm). In various embodiments, multiple silicone inserts 250 may be contained within one engine block clamp frame 105. For example, engine block clamp frame 105 may comprise a width of 1.5 inches (38.1 mm) and two silicone inserts 250 having widths of 0.750 inches (19.05 mm) may be retained. Silicone insert 250 may comprise any suitable material. For example, silicone insert 250 may comprise an unfilled silicone material (i.e., a silicone material comprising no additional fibers and/or the like for reinforcement) or a fiber or otherwise reinforced silicone material. Silicone insert 250 may also comprise fluorocarbon or fluorosilicone, depending on fluid compatibility and temperature parameters.

Figure 3:
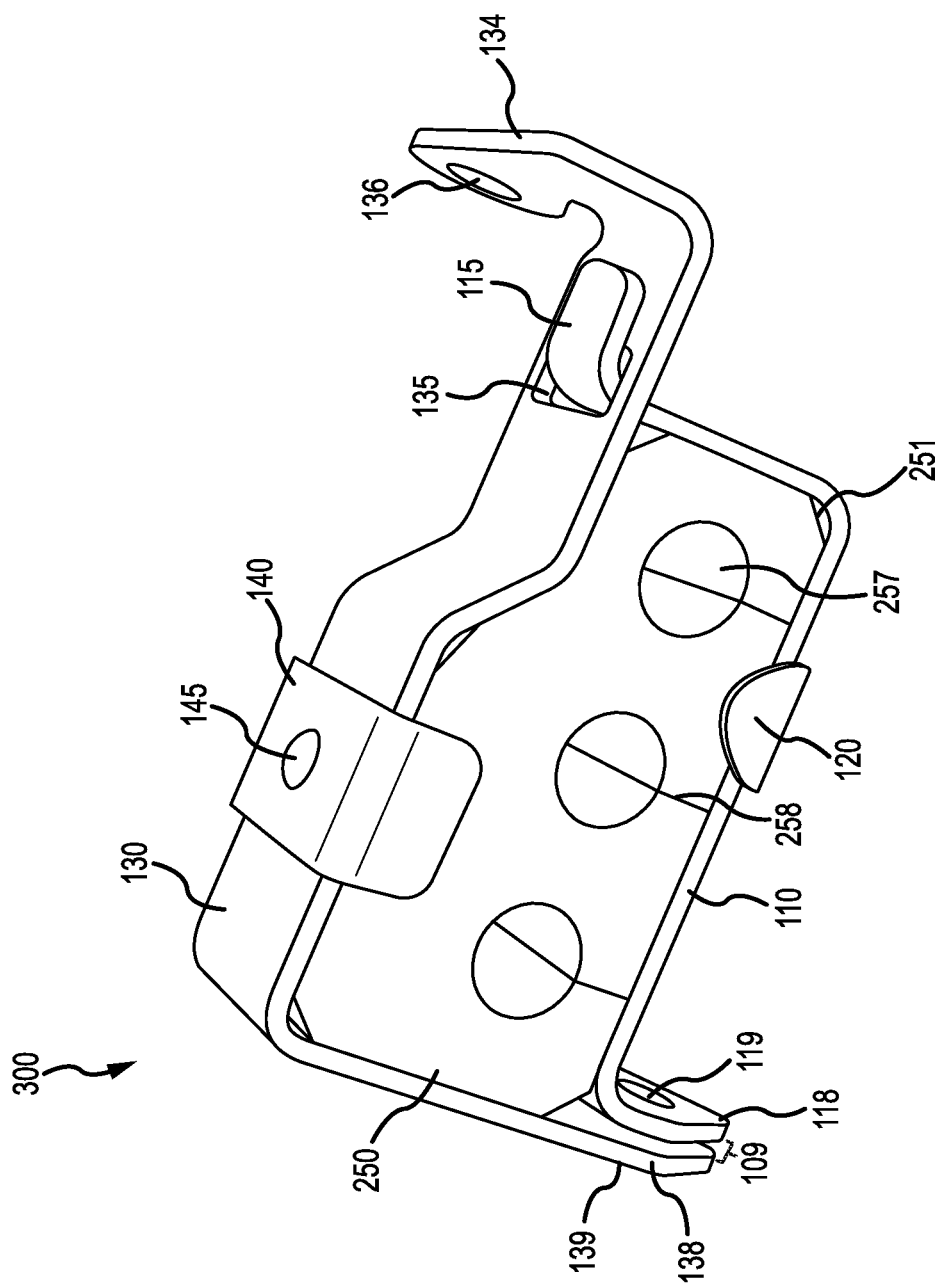
FIG. 3 illustrates a perspective view of an engine block clamp assembly, in accordance with various embodiments.

In various embodiments, with further reference to FIG. 2 and reference to FIG. 3, silicone insert 250 may comprise a relief cut 251, a rivet void 255, an aperture 257, and an expansion slit 258. Relief cut 251 may comprise a portion of an axially outer edge of silicone insert 250 that is removed to allow for loose tolerances. Relief cut 251 may comprise any suitable size, and silicone insert 250 may comprise a plurality of relief cuts 251 located in any desired and/or suitable location. For example, as depicted in FIG. 3, relief cut 251 may enable silicone insert 250 to securely fit between tabbed clamp half 110 and slot clamp half 130 in engine block clamp assembly 300.

In various embodiments, rivet void 255 may comprise a portion of an axially outer edge of silicone insert 250 that is removed to provide space for a rivet to protrude. Rivet void 255 may comprise any suitable shape and size capable of providing space for a rivet to protrude, and silicone insert 250 may comprise any number of rivet voids 255 located in any desired and/or suitable location. For example, as depicted in FIG. 3, rivet void 255 may be located proximate second rivet 145, and may comprise a depth allowing second rivet 145 to couple second retaining clip 140 to slot clamp half 130.

In various embodiments, aperture 257 may comprise a void through silicone insert 250. Aperture 257 may be configured to receive various engine external harnesses and tubes. In that regard, aperture 257 may comprise any suitable shape and size capable of receiving an engine external harness or tube. In various embodiments, silicone insert 250 may comprise any suitable and/or desired number of apertures 257. For example, silicone insert 250 may comprise three apertures 257. Silicone insert 250 may also comprise two apertures 257. Expansion slit 258 may comprise a cut through silicone insert 250, running from aperture 257 through an axially outer edge of silicone insert 250. In this regard, expansion slit 258 may be configured to enable aperture 257 to expand and retract as necessary to receive an engine external harness and/or tube. For example, as aperture 257 receives an engine external harness and/or tube, expansion slit 258 may enable aperture 257 to expand to fit the engine external harness and/or tube. The use of expansion slit 258 may therefore enable aperture 257 to tightly and securely fit an engine external harness and/or tube.

Figure 4:
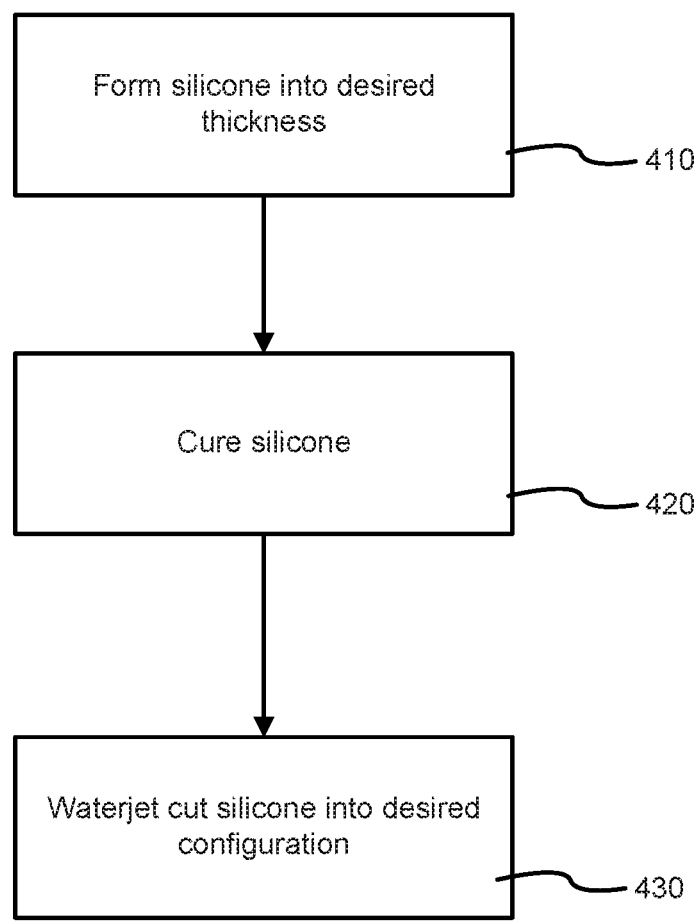
FIG. 4 illustrates a process flow for a method of forming a silicone insert for an engine block clamp assembly, in accordance with various embodiments.

In various embodiments, and with reference to FIG. 4, a method 400 of forming a silicone insert for an engine block clamp assembly is disclosed. Method 400 may allow the formation of a silicone insert without the need for fabricated metal molds. Fabricated metal molds may have to be reworked and recreated in the event of a configuration change to the silicone insert. In that regard, method 400 may therefore enable the formation of a silicone insert quickly, easily, and at a lesser cost.

In various embodiments, method 400 may comprise forming silicone into a desired thickness (step 410). Step 410 may comprise forming the silicone into a sheet mold having a desired thickness. The mold may comprise any suitable size allowing for the formation of a desired width of the silicone insert. For example, where the desired silicone insert width is 0.7500 inches (19.05 mm), the silicone may be formed using a mold allowing for a 0.7500 inches (19.05 mm) thick silicone sheet. The silicone may be molded using any suitable method allowing the silicone to form into a desired thickness. In various embodiments, method 400 may also comprise curing the formed silicone (step 420). In this regard, step 420 may comprise curing the formed silicone using any suitable curing technique known in the art.

In various embodiments, method 400 may comprise waterjet cutting the cured silicone into a desired configuration (step 430). Waterjet cutting is a process known in the art wherein a high-pressure jet of water mat be used to cut a variety of materials. Typically, waterj et cutting uses a mixture of water and an abrasive media, such as garnet, to cut through materials. Waterjet cutting using water mixed with an abrasive media may present problems when cutting a silicone material, as the abrasive media may become entrapped in the silicone. If entrapped in the silicone material, the abrasive media may rub against the external engine harnesses and tubes.

In various embodiments, step 430 may enable the silicone to be waterjet cut using pure water (i.e., water with no abrasive media). Waterjet cutting using pure water may eliminate the need for any subsequent finishing to the silicone (e.g., finishing required to remove impregnated abrasive media), and may also allow for tighter tolerances within the cuts. In step 430, the cured and formed silicone may be waterjet cut using pure water. With further reference to FIG. 2, step 430 may comprise waterjet cutting the silicone into silicone insert 250. For example, step 430 may comprise waterjet cutting the silicone into the desired shape and size for silicone insert 250. Step 430 may then also comprise waterjet cutting relief cuts 251, rivet voids 255, apertures 257, and/or expansion slits 258. Waterjet cutting expansion slit 258 may also enable the formation of expansion slit 258 having a diameter of 0.00001667 inch (0.00042333 mm).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An engine block clamp assembly, comprising:
   a silicone insert having an aperture, a first fastener recess, and a second fastener recess; and
   an engine block clamp frame configured to clamp around a circumferential edge of the silicone insert, the engine block clamp frame comprising:
   a tabbed clamp half;
   a slot clamp half coupled to the tabbed clamp half;
   a first retaining clip coupled to an outer surface of the tabbed clamp half by a first fastener, the first retaining clip comprising a first clip main body and a first clip end bent inward towards the slot clamp half from a longitudinal distal end of the first clip main body, wherein a longitudinal axis of the outer surface of the tabbed clamp half is perpendicular to a longitudinal axis of the first clip main body, and wherein the first clip end is configured to retain the silicone insert between the tabbed clamp half and the slot clamp half; and a second retaining clip coupled to an outer surface of the slot clamp half by a second fastener, the second retaining clip comprising a second clip main body and a second clip end bent inward towards the tabbed clamp half from a longitudinal distal end of the second clip main body, wherein a longitudinal axis of the outer surface of the slot clamp half is perpendicular to a longitudinal axis of the second clip main body, wherein the second clip end is configured to retain the silicone insert between the tabbed clamp half and the slot clamp half, and wherein the first fastener recess is configured to provide a first clearance for the first fastener, and the second fastener recess is configured to provide a second clearance for the second fastener;

wherein either the first fastener comprises a first rivet configured to be bucked to couple the first retaining clip to the tabbed clamp half or the second fastener comprises a second rivet configured to be bucked to couple the second retaining clip to the slot clamp half.

2. The engine block clamp assembly of claim 1, wherein the tabbed clamp half comprises a tabbed end opposite of a tabbed clamp half mounting end, and wherein the tabbed end comprises a tabbed hinge.

3. The engine block clamp assembly of claim 2, wherein the slot clamp half comprises a slot end opposite of a slot clamp mounting end, wherein the slot end comprises a slot, and wherein the slot clamp half couples to the tabbed clamp half by inserting the tabbed hinge into the slot.

4. The engine block clamp assembly of claim 1, wherein the silicone insert is formed using a waterjet cutting process.

5. The engine block clamp assembly of claim 4, wherein the waterjet cutting process uses a pure water to cut the silicone insert, without the use of any abrasive media in water.

6. The engine block clamp assembly of claim 1, wherein the circumferential edge of the silicone insert defines a relief cut configured to enable the silicon insert to securely fit within the engine block clamp frame.

7. The engine block clamp assembly of claim 1, wherein the silicone insert defines an expansion slit extending from the aperture to the circumferential edge, wherein the expansion slit is configured to expand in response to an engine harness or a tube being inserted within the aperture.

8. The engine block clamp assembly of claim 1, wherein the first clip end of the first retaining clip comprises a first shape, wherein the second clip end of the second retaining clip comprises a second shape, and wherein each of the first shape and the second shape comprises a triangle, a square, or a rounded edge.

9. An engine block clamp assembly, comprising:
a tabbed clamp half having a tabbed end opposite of a tabbed clamp half mounting end, wherein the tabbed end comprises a tabbed hinge and the tabbed clamp half mounting end comprises a tabbed clamp half mounting hole;
a slot clamp half having a slot end opposite of a slot clamp half mounting end, wherein the slot end comprises a slot and the slot clamp half mounting end comprises a slot clamp half mounting hole, and wherein the slot clamp half is configured to couple to the tabbed clamp half by inserting the tabbed hinge into the slot;
a tabbed clamp half retaining clip coupled by a first fastener to an outer surface of the tabbed clamp half, wherein the tabbed clamp half retaining clip is coupled to the outer surface of the tabbed clamp half at a first coupling point located between the tabbed end and the tabbed clamp half mounting end, wherein the tabbed clamp half retaining clip comprises a first retaining clip main body and a first retaining clip end bent inward towards the slot clamp half from a longitudinal distal end of the first retaining clip main body, and wherein a longitudinal axis of the outer surface of the tabbed clamp half is perpendicular to a longitudinal axis of the first retaining clip main body; and a slot clamp half retaining clip coupled by a second fastener to an outer surface of the slot clamp half, wherein the slot clamp half retaining clip is coupled to the outer surface of the slot clamp half at a second coupling point located between the slot end and the slot clamp half mounting end, wherein the slot clamp half retaining clip comprises a second retaining clip main body and a second retaining clip end bent inward towards the tabbed clamp half from a longitudinal distal end of the second retaining clip main body, and wherein a longitudinal axis of the outer surface of the slot clamp half is perpendicular to a longitudinal axis of the second retaining clip main body;

wherein either the first fastener comprises a first rivet configured to be bucked to couple the tabbed clamp half retaining clip to the tabbed clamp half or the second fastener comprises a second rivet configured to be bucked to couple the slot clamp half retaining clip to the slot clamp half.

10. The engine block clamp assembly of claim 9, further comprising a silicone insert, wherein the tabbed clamp half and the slot clamp half are configured to clamp around a circumferential edge of the silicone insert.

11. The engine block clamp assembly of claim 10, wherein the silicone insert is formed using a waterjet cutting process.

12. The engine block clamp assembly of claim 11, wherein the waterjet cutting process uses a pure water to cut the silicone insert, without the use of any abrasive media in water.

13. The engine block clamp assembly of claim 11, wherein the silicone insert comprises a width of 0.75 inch.

14. The engine block clamp assembly of claim 9, wherein the slot end of the slot clamp half defines a first portion and a second portion, wherein the first portion comprises the slot and the second portion comprises a slot end mounting hole.

15. An engine block clamp assembly, comprising:
a silicone insert having at least one aperture; and
an engine block clamp frame configured to clamp around a circumferential edge of the silicone insert, the engine block clamp frame comprising:
a tabbed clamp half having a tabbed end opposite of a tabbed clamp half mounting end, wherein the tabbed end comprises a tabbed hinge;
a slot clamp half having a slot end opposite of a slot clamp half mounting end, wherein the slot end comprises a slot, and wherein the slot clamp half is configured to couple to the tabbed clamp half by inserting the tabbed hinge into the slot;
a tabbed clamp half retaining clip coupled via a first fastener to an outer surface of the tabbed clamp half, wherein the tabbed clamp half retaining clip is coupled to the outer surface of the tabbed clamp half at a first coupling point located between the tabbed end and the tabbed clamp half mounting end, wherein the tabbed clamp half retaining clip comprises a first retaining clip main body and a first retaining clip end bent inward towards the slot clamp half from a longitudinal distal end of the first retaining clip main body, and wherein a longitudinal axis of the outer surface of the tabbed clamp half is perpendicular to a longitudinal axis of the first retaining clip main body; and a slot clamp half retaining clip coupled via a second fastener to an outer surface of the slot clamp half, wherein the slot clamp half retaining clip is coupled to the outer surface of the slot clamp half at a second coupling point located between the slot end and the slot clamp half mounting end, wherein the slot clamp half retaining clip comprises a second retaining clip main body and a second retaining clip end bent inward towards the tabbed clamp half from a longitudinal distal end of the second retaining clip main body, and wherein a longitudinal axis of the outer surface of the slot clamp half is perpendicular to a longitudinal axis of the second retaining clip main body;

wherein either the first fastener comprises a first rivet configured to be bucked to couple the tabbed clamp half retaining clip to the tabbed clamp half or the second fastener comprises a second rivet configured to be bucked to couple the slot clamp half retaining clip to the slot clamp half.

16. The engine block clamp assembly of claim 15, wherein the silicone insert is formed using a waterjet cutting process.

17. The engine block clamp assembly of claim 16, wherein the waterjet cutting process uses a pure water to cut the silicone insert, without the use of any abrasive media.

18. The engine block clamp assembly of claim 16, wherein the silicone insert comprises a width of 0.75 inch.

* * * * *